United States Patent [19]

Bibaut

[11] 3,970,029

[45] July 20, 1976

[54] EARTH MOVING MACHINERY MADE AMPHIBIOUS

[76] Inventor: Gilbert Abel Bibaut, 22, rue de Compiegne, 60880 Le Meux, France

[22] Filed: Aug. 7, 1974

[21] Appl. No.: 495,372

[30] Foreign Application Priority Data
Aug. 9, 1973  France .............................. 73.29469

[52] U.S. Cl. ............................ 115/1 R; 114/66.5 F
[51] Int. Cl.² .......................................... B60F 3/00
[58] Field of Search ............... 115/1 R; 114/123, 61, 114/66.5 F; 37/71

[56] References Cited
UNITED STATES PATENTS

| | | | |
|---|---|---|---|
| 1,705,303 | 3/1929 | Nagy | 114/123 |
| 1,722,516 | 7/1929 | Cook | 115/1 R |
| 3,064,370 | 11/1962 | La Fleur | 37/71 |
| 3,777,919 | 12/1973 | Konijn | 115/1 R |
| 3,812,804 | 5/1974 | Nagata et al. | 115/1 R |
| 3,819,240 | 6/1974 | Bibaut | 115/1 R |

*Primary Examiner*—Trygve M. Blix
*Assistant Examiner*—Charles E. Frankfort
*Attorney, Agent, or Firm*—Weiser, Stapler & Spivak

[57] ABSTRACT

Conventional earth moving machines for dredging and scraping ponds or bogs are made amphibious, so as to enable them to move over water as well as over mud, by means of two detachable water-tight enclosures of tubular cross-section, placed on either side of the machine, those enclosures having provision for temporarily connecting them to the sides of the machines.

7 Claims, 3 Drawing Figures

EARTH MOVING MACHINERY MADE AMPHIBIOUS

The invention relates to apparatus for transforming into amphibious equipment, the conventional machines for dredging or scraping ponds or bogs, in order to facilitate their movement over water as well as across mud.

The use of conventional machines for dredging and scraping ponds poses grave difficulties in view of both the weight of these machines and the swampy character of the soil over which they must maneuver. This creates the risk that the machines may bog down, with all of the difficulties which their subsequent extraction entails. In addition, even if the machines do not get bogged down, there is inevitably experienced a suction effect through contact with the mud, which resists the free movement of the machinery and requires heavy energy expenditure.

When it is necessary to work on water, e.g. ponds, lakes, tidal flats, etc., the problems increase by an order of magnitude because in that case the machines must be made fully amphibious. This requires a major change in their structure, which is not only expensive but, even worse, requires such modifications that thereafter they can only be used in this type of operation. The machines are therefore no longer usable interchangeably on marshy areas and on dry land.

Accordingly, the invention has as an object to provide an arrangement which makes it possible to rapidly convert conventional machines into amphibious ones. Moreover, the same are to be capable of being used again in their conventional mode, quickly and through simple disassembly.

For further details, reference may be had to the description which follows, in the light of the accompanying drawings wherein.

Figure 1:
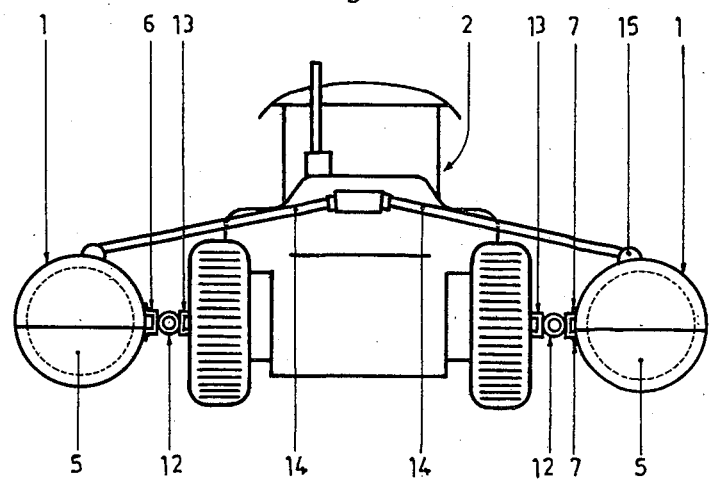
FIG. 1 is a diagrammatic front elevation view of machinery equipped in accordance with the invention.

Referring to FIG. 1, an embodiment of the invention comprises at least two detachable enclosures of cylindrical shape, these enclosures being water-tight and extending on opposite sides of the dredging or scraping machine 2. These enclosures may be formed, in accordance with the embodiment under discussion, from semi-circular sheet metal troughs welded along their edges in order to form tubular pontoons of high carrying capacity.

Figure 2:
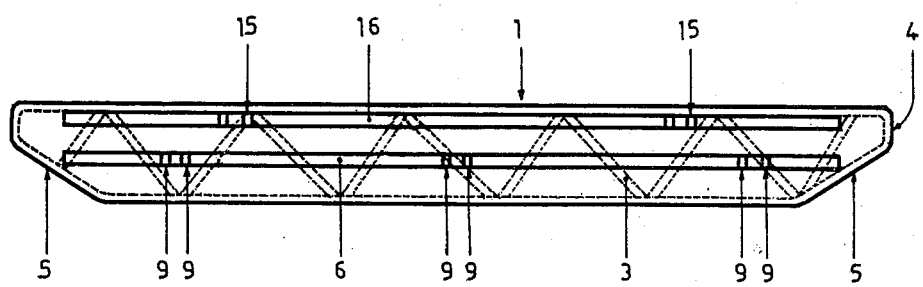
FIG. 2 is a side elevation showing certain details of this equipment.

As shown in FIG. 2, these water-tight tubular enclosures 1 are given internal rigidity by criss-crossing channels or braces 3 which prevent radial deformation or buckling of the enclosures. To make them slide more easily, when in contact with mud, the two end faces 4 of these enclosures are provided with sloping portions 5.

Figure 3:
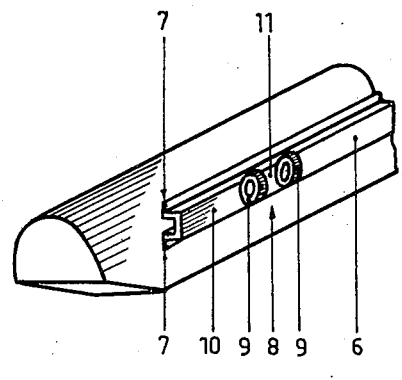
FIG. 3 is a fragmentary perspective view of the same equipment.

Each enclosure has at least one U-shaped channel 6, welded at 7 along at least one of its flanges, these channels being provided (see FIG. 3) with journals 8 formed of pairs of ears 9 welded to face 10 of the channel. The members of any given pair of ears are spaced apart to define between them a recess 11 in which can be inserted a complementary ear 12 welded to beam 13 attached to the machine.

Ears 12 of the machine are engaged between ears 9 of the enclosures and then interlocked by a pin (not shown) serving as pivot.

Thus, the enclosures are mounted movably relative to the sides of the machine, and are adjustable in height. This adjustment is achieved by two telescopic arms 14 operated from the machine. To that end, the upper surface of each enclosure has a pair of protrusions 15, to which the telescopic arms are attached. These protrusions are welded to a channel 16, firmly attached to the respective enclosure.

It will be understood that these enclosures may also be made with other shapes, or from other materials, without departing from the inventive concept.

These enclosures make it possible to convert, quickly and without major alterations, conventional earth moving machinery into amphibious machinery equally capable of maneuvering on water (in which case the enclosures serve as pontoons) and on mud (in which case the enclosures serve as skids). The detachable character of the enclosures makes it easy, by smply withdrawing the pins which connect them to the machine, to restore to the latter its conventional ability to maneuver, for example, on dry land.

I claim:

1. Apparatus for making amphibious a dry-land earth moving machine which is inherently incapable of supporting itself on water, said apparatus comprising
   at least two tubular, water-tight elements adapted to be positioned on either side of said machine;
   detachable coupling means between said machine and each of said tubular elements; and
   means for controlling the elevation of said elements relative to the machine,
   said elements being constructed to be of substantially unchanging interior volume and to make the machine capable of supporting itself on water,
   said detachable coupling means comprising substantially vertical ears protruding from the elements toward the machine and mating with substantially vertical ears protruding from the machine toward the elements and removable pins for joining the ears for pivotal movement of the elements about substantially horizontal axes defined by the pins.

2. The apparatus of claim 1, wherein the elements are of welded, substantially semi-cylindrical sheet metal sections with sloping end faces and are given internal rigidity by crisscrossing channels.

3. The apparatus of claim 1 wherein each ear protruding from the machine is engaged in a recess between a pair of ears protruding from the tubular element, and each pin extends through all three of said ears.

4. The apparatus of claim 1 wherein the ears protruding from the elements are attached to the respective elements along a channel member extending longitudinally of the element.

5. The apparatus of claim 1 wherein the elevation controlling means includes a plurality of telescoping arms, each arm being attached at one end to the machine and at the other end to a tubular element.

6. The apparatus of claim 5 wherein each telescoping arm is attached to the element by means of a protrusion from the upper surface of the element.

7. The apparatus of claim 5, wherein said arms are operated from said machine.

* * * * *